United States Patent [19]

Keeler, II

[11] 4,257,581
[45] Mar. 24, 1981

[54] IMPACT ABSORBING STRUT
[75] Inventor: Miner S. Keeler, II, Grand Rapids, Mich.
[73] Assignee: Keeler Corporation, Grand Rapids, Mich.
[21] Appl. No.: 60,452
[22] Filed: Jul. 25, 1979
[51] Int. Cl.³ .............................................. F16F 9/36
[52] U.S. Cl. .................................... 267/116; 188/1 C;
188/322; 267/8 R; 293/133; 293/134
[58] Field of Search ...................... 188/1 C, 322, 269;
267/65 A, 116, 139, 8 R; 293/133, 134

[56] References Cited
U.S. PATENT DOCUMENTS

| 879,198 | 2/1908 | Schirmer . | |
|---|---|---|---|
| 1,799,065 | 3/1931 | Rohm . | |
| 2,135,749 | 11/1938 | Gullo . | |
| 2,828,960 | 4/1958 | Lucien et al. | 188/269 X |
| 2,977,146 | 3/1961 | Edwards et al. . | |
| 3,201,112 | 8/1965 | Wossner . | |
| 3,265,163 | 8/1966 | Gilbert et al. | 293/134 X |
| 3,362,742 | 1/1968 | Sanderson . | |
| 3,797,818 | 3/1974 | Willich et al. . | |
| 3,841,681 | 10/1974 | Dera et al. . | |
| 3,860,258 | 1/1975 | Feustel et al. | 293/133 X |
| 3,891,199 | 6/1975 | Willich et al. . | |
| 3,944,270 | 3/1976 | Kreuger . | |

FOREIGN PATENT DOCUMENTS 1142761 1/1963 Fed. Rep. of Germany .
1215193 12/1970 United Kingdom .
1396421 6/1975 United Kingdom .

Primary Examiner—George E. A. Halvosa
Attorney, Agent, or Firm—Price, Heneveld, Huizenga & Cooper

[57] ABSTRACT

An impact absorbing strut or shock absorber is disclosed comprising at least two telescoping tubes defining a damping fluid chamber. A quantity of damping fluid partially fills the chamber and a quantity of compressible gas fills the remainder of the chamber. The compressible gas absorbs small loads imposed upon the shock absorber. A fluid throttling port communicates with the chamber and a blowout plug is normally disposed in the fluid throttling port. When the shock absorber is heavily loaded the plug is ejected from the port to allow the damping fluid to be throttled through the port. A frangible polymeric encasement surrounds the shock absorber and seals the damping fluid and compressible gas therein. Relative movement between the encasement and one of the telescoping tubes is provided to absorb small deflections of the shock absorber without rupturing the encasement.

3 Claims, 3 Drawing Figures

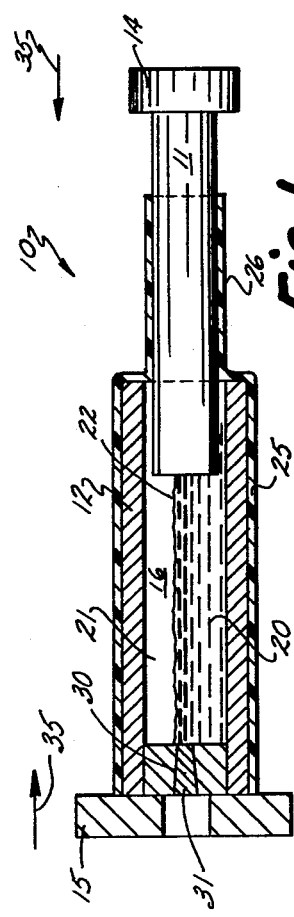
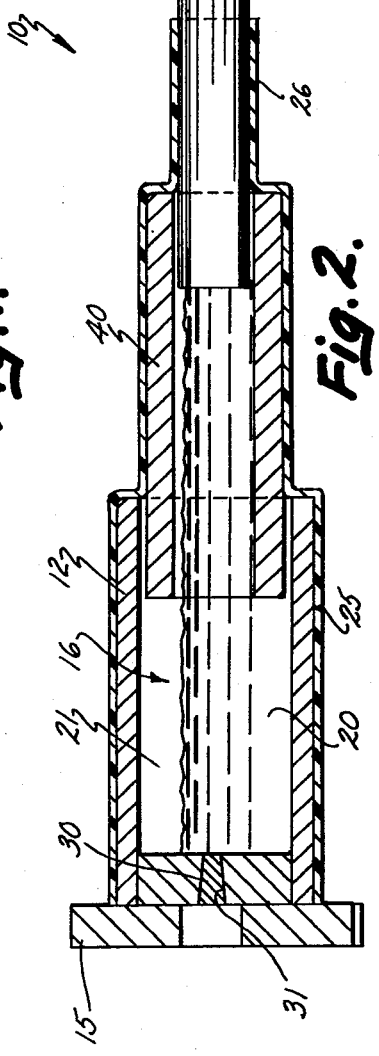
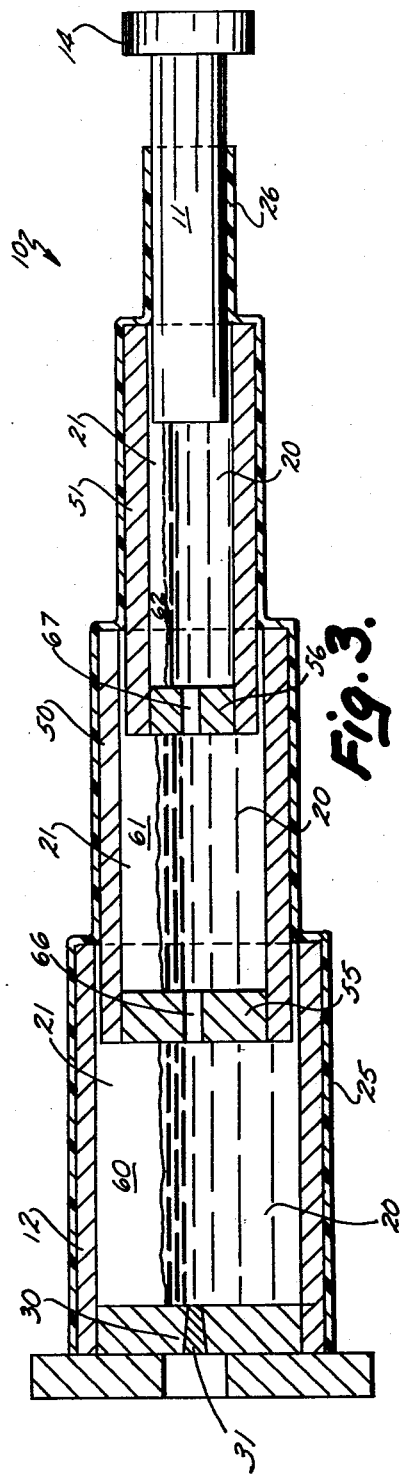

IMPACT ABSORBING STRUT

BACKGROUND OF THE INVENTION

The invention relates generally to impact absorbing struts. More particularly, the invention relates to a shock absorbing device such as that interconnecting the chassis and bumper of a motor vehicle for protecting motor vehicles from damage by low speed collisions.

It is known to install piston and cylinder type fluid filled shock absorbers between a bumper and the chassis of an automotive vehicle for dissipating the energy of a low speed collision without serious damage to the vehicle. A liquid is driven in the known arrangements by the force of the impact through a throttling passage in which the kinetic energy of the flowing viscous liquid is converted to thermal energy. If a resilient element such as a spring or a cushion of gas under pressure is provided, it serves mainly to expel the piston from the cylinder after the impact and thereby to restore the original condition of the shock absorber if the latter is not damaged in the collision. In one prior art arrangement, compression of a gas within the shock absorber is simultaneously provided for, along with throttling of a viscous liquid through a port, for the purpose of mitigating the temperature sensitivity of this type of shock absorber.

In other known shock absorbing arrangements, a shock absorber defines a fluid cylinder including one or more blowout plugs. Upon impact, the plugs are blown out of their ports and the energy of the impact is absorbed by throttling a viscous fluid through the ports. In other shock absorbers of the type in which a viscous fluid is ejected from a shock absorber cylinder, the shock absorber cylinder is at least partially surrounded by a resilient bellows which accommodates the displaced liquid upon impact and urges the liquid back into the cylinder through the throttling ports after the impact.

SUMMARY OF THE INVENTION

According to the present invention, an impact absorbing strut or shock absorber is provided comprising first and second relatively movable, telescoping tubes. The telescoping tubes define a damping fluid chamber which is partially filled with a quantity of a viscous damping fluid. The remainder of the chamber is filled with a compressible gas. The compressible gas absorbs small shocks or loads causing minor deflection of the telescoping tubes. A fluid throttling port is provided communicating with the chamber. A blowout plug is normally disposed in the port; the blowout plug being adapted for ejection from the port at a predetermined chamber pressure. When the predetermined chamber pressure is met by a relatively heavy shock, the liquid in the damping fluid chamber is driven through the throttling port to dissipate the impact energy. A frangible, polymeric encasement surrounds the shock absorber and seals the damping fluid and compressible gas therein. The encasement is somewhat resilient and thus allows deflection on one of the relatively movable telescoping tubes with respect to the encasement to absorb small deflections of the shock absorber tubes. However, the frangible encasement breaks away from the shock absorber to allow full compression of the shock absorber during a relatively heavy impact. One or more additional relatively movable telescoping tubes may be provided for enlarging the fluid damping chamber and lengthening the stroke of the shock absorber. These additional, relatively movable, telescoping tubes may be provided with separating baffles creating a series of adjacent damping fluid chambers interconnected by serially arranged throttling ports for increasing the stiffness of the shock absorber.

BRIEF DESCRIPTION OF THE DRAWINGS

FIG. 1 is an elevational view, partially in section, of one embodiment of the shock absorber of the present invention.

FIG. 2 is an elevational view, partially in section, of another embodiment of the shock absorber of the present invention.

FIG. 3 is an elevational view, partially in section, of another embodiment of the shock absorber of the present invention.

DESCRIPTION OF THE PREFERRED EMBODIMENTS

Referring to FIG. 1, an impact absorbing strut or shock absorber 10 is illustrated. The shock absorber 10 comprises first and second relatively movable telescoping tubes 11 and 12, respectively. The shock absorber 10 may be disposed between any two relatively movable members in an application where it is desirable to absorb an impact energy between the relatively movable members. For example, the shock absorber 10 is particularly adapted for use between the chassis and bumper of an automotive vehicle. In the case where the shock absorber 10 is so used, flanges 14 and 15 disposed on opposite ends of shock absorber 10 may be bolted or otherwise suitably secured to the bumper and chassis, respectively, of an automotive vehicle. The first and second tubes 11 and 12 define a damping fluid chamber 16 therebetween. The first tube 11 may comprise a simple plunger which is solid, as indicated herein, or may be hollow like the tube 12 to increase the capacity of the damping fluid chamber 16. The damping fluid chamber 16 is partially filled with a viscous damping fluid 20 such as oil. The remaining section 21 of the chamber 16 is filled with a compressible gas such as air. In this case, the air/gas interface 22 is illustrated as extending horizontally the length of chamber 16, since in an automotive application, generally a plurality of shock absorbers 10 will extend in a generally horizontal direction between the bumper and chassis of the vehicle.

The shock absorber 10 is surrounded by a frangible, polymeric or plastic encasement 25. The encasement 25 seals the damping fluid and compressible gas within the chamber 16. This eliminates the need for sealing O-rings, or the like, between the telescoping tubes 11 and 12. This significantly reduces the cost of manufacturing the shock absorber 10 since dimensional tolerances between the tubes 11 and 12 are greatly relaxed and provision of encasement 25 is much simpler and more straightforward than provision of sealing means between the tubes 11 and 12. The encasement 25 may be made from a variety of polymeric materials that may be applied to the exterior of the shock absorber 10 in a variety of methods. For example, a heat shrinkable tubular sheath may be slipped over the exterior of shock absorber 10 and heat later applied so that the sheath closely conforms to the exterior of the shock absorber 10, as illustrated in FIG. 1. In other cases, the encasement 25 may be applied to the shock absorber 10 by dipping to form a coating of a suitable polymeric material. Preferably, the polymeric material forming encasement 25 is sufficiently resilient to allow relative movement between the first tube 11 and a neck 26 of the encasement 25 without rupturing the encasement. This allows the shock absorber 10 to absorb small impacts causing small deflection of the relatively movable tubes 11 and 12 without rupturing the encasement 25. However, during larger deflections that completely compress first and second telescoping tubes 11 and 12, the neck 26, and/or the body of the encasement 25 ruptures or fragments, to provide for complete compression of the shock absorber 10.

The second tube 12 includes a fluid throttling port 30 in communication with the damping fluid chamber 16. The port 30 interconnects the damping fluid chamber 16 and the exterior of the shock absorber 10. Normally, a blowout plug 31 is disposed in the port 30. The plug 31 and the port 30 may, for example, be provided with a predetermined taper and cross-sectional area such that the plug 31 is ejected from the port 30 at a predetermined chamber pressure. In the normal operation of the shock absorber 10, small impacts tending to compress the first and second tubes 11 and 12 in the direction of the arrows 35, are absorbed by compression of the gas disposed in section 21 of the chamber 16 and by relative movement between the neck 26 of the encasement 25 and the first tube 11. After compressive forces created by the impact are removed, the compressible gas, in section 21 of the chamber 16, reexpands the shock absorber 10 to its normal position. However, when a large impact, creating relatively large compressive forces in the direction of the arrows 35 is encountered, (that is, an impact greater than the predetermined pressure at which blowout plug 31 is ejected from throttling port 30) the plug 31 is ejected and the impact energy is absorbed by throttling of the viscous fluid 20 through port 30.

Referring now to FIG. 2, an embodiment of the shock absorber 10 is illustrated including one or more additional, relatively movable telescoping tubes such as the tube 40. The additional telescoping tube 40 is disposed between the first and second relatively movable tubes 11 and 12, respectively. The additional tube 40 serves to enlarge the damping chamber 16, lengthening the stroke of the shock absorber 10 and increasing its impact absorbing capability. In all other regards, the operation of the shock absorber 10 illustrated in FIG. 2 is the same as that illustrated in FIG. 1, and like components are given the same numeral designation.

Referring now to FIG. 3, an embodiment of the shock absorber 10 is illustrated wherein two additional telescoping tubes 50 and 51 are provided disposed between first and second tubes 11 and 12, respectively. In this case, the additional tubes 50 and 51 are also provided with baffles 55 and 56. The baffles 55 and 56 separate the damping fluid chamber within the shock absorber 10 into a plurality of damping fluid chambers 60, 61 and 62, serially arranged by additional throttling ports 66 and 67 disposed in baffles 55 and 56, respectively. In this case, each of the serially arranged damping fluid chambers 60, 61 and 62 is illustrated as having a section 20 and a section 21 filled with a damping fluid and a compressible gas, respectively. However, it is to be understood that only one of the damping fluid chambers may be so provided to accommodate small deflections of the shock absorber 10. Where only one of the serially arranged damping fluid chambers is to be provided with a compressible gas, the chamber 62 is preferably so provided. The provision of additional baffles 55 and 56 with additional throttling ports 66 and 67 stiffens the shock absorber. It should be understood that embodiments of the invention are contemplated wherein not all of the additional tubes, such as the tubes 50 and 51 are provided with baffles such as the baffles 55 and 56. By varying the diameter and length of the telescoping tubes of the shock absorber, the type and amount of compressible gas and damping fluid, as well as the number of additional telescoping tubes and baffles, and the design of the blowout plug, the shock absorber of the present invention may be tuned for a wide variety of applications.

The above description should be considered as exemplary and that of the preferred embodiment only. The true spirit and scope of the present invention should be determined by reference to the appended claims. It is desired to include within the appended claims all such modifications of the invention that come within the proper scope of the invention.

The embodiments of the invention in which an exclusive property or privilege is claimed are defined as follows.

1. A shock absorber comprising:
   first and second relatively movable telescoping tubes;
   a damping fluid chamber defined by said first and second telescoping tubes;
   a quantity of damping fluid partially filling said chamber;
   a quantity of compressible gas filling the remainder of said chamber to absorb small loads;
   a fluid throttling port extending through one of said tubes and communicating with said chamber through which said damping fluid is forced when said shock absorber is heavily loaded;
   a blowout plug normally disposed in said port, said plug being adapted for ejection from said port at a predetermined chamber pressure;
   a frangible polymeric encasement surrounding said shock absorber and secured thereto for sealing said damping fluid and said compressible gas therein, said encasement having sufficient resiliency to absorb small deflections of said first and second telescoping tubes without rupturing and rupturing upon large deflections of said first and second telescoping tubes.

2. The shock absorber of claim 1 further including one or more additional relatively movable telescoping tubes for enlarging said chamber and lengthening the stroke of said shock absorber.

3. The shock absorber of claim 1 further including:
   one or more additional relatively movable telescoping tubes, said additional tubes being disposed between said first and second tubes;
   one or more additional damping fluid chambers, each of said additional chambers being defined by one of said additional tubes;
   one or more baffles separating adjacent fluid chambers; and
   one or more additional throttling ports disposed in said baffles and communicating between adjacent fluid chambers.

* * * * *